(12) United States Patent
Sherrill

(10) Patent No.: US 9,541,658 B2
(45) Date of Patent: Jan. 10, 2017

(54) DYNAMICALLY ALLOCATING DIFFERENT NUMBERS OF BITS TO WINDOWS OF A SERIES REPRESENTING A SEISMIC TRACE

(75) Inventor: Francis G. Sherrill, Katy, TX (US)

(73) Assignee: WESTERNGECO L. L. C., Houston, TX (US)

(*) Notice: Subject to any disclaimer, the term of this patent is extended or adjusted under 35 U.S.C. 154(b) by 2158 days.

(21) Appl. No.: 12/171,864

(22) Filed: Jul. 11, 2008

(65) Prior Publication Data

US 2009/0034367 A1 Feb. 5, 2009

Related U.S. Application Data

(60) Provisional application No. 60/963,135, filed on Aug. 2, 2007.

(51) Int. Cl.
*G01V 1/24* (2006.01)

(52) U.S. Cl.
CPC ..................... *G01V 1/247* (2013.01)

(58) Field of Classification Search
CPC ..................... G01V 1/247
USPC ............ 702/2, 6–7, 9, 11–12, 14–18, 66–68, 71,702/73, 189; 367/25, 27–30, 36–38, 47
See application file for complete search history.

(56) References Cited

U.S. PATENT DOCUMENTS

| | | | |
|---|---|---|---|
| 4,312,050 A * | 1/1982 | Lucas | 367/44 |
| 4,359,608 A | 11/1982 | Watson et al. | |
| 4,644,506 A * | 2/1987 | Cretin et al. | 367/19 |
| 5,550,787 A * | 8/1996 | Rialan et al. | 367/77 |
| 5,594,706 A * | 1/1997 | Shenoy et al. | 367/76 |
| 5,745,392 A * | 4/1998 | Ergas et al. | 708/203 |
| 5,819,214 A * | 10/1998 | Suzuki et al. | 704/229 |
| 5,848,193 A * | 12/1998 | Garcia | 382/232 |
| 5,933,790 A * | 8/1999 | Jeffryes | 702/17 |
| 6,021,378 A * | 2/2000 | Reiter et al. | 702/14 |
| 6,826,227 B1 * | 11/2004 | Duval et al. | 375/240 |
| 7,272,567 B2 * | 9/2007 | Fejzo | 704/500 |
| 2002/0129073 A1 * | 9/2002 | Page et al. | 708/300 |
| 2005/0025371 A1 * | 2/2005 | Atsumi et al. | 382/239 |
| 2007/0299898 A1 * | 12/2007 | Richey et al. | 708/490 |

FOREIGN PATENT DOCUMENTS

WO 2005096016 A1 10/2005

OTHER PUBLICATIONS

Bordley, "Linear Predictive Coding of Marine Seismic Data", IEEE Transactions on Acoustics, Speech and Signal Processing, vol. ASSP-31 No. 4, Aug. 1983.*
Daly et al., "Variable Bit Rate Vector Quantization of Video Images for Packet-Switched Networks", 1988, IEEE, pp. 1160-1163.*
Peterson, et al., Lossless compression of Seismic Data, IEEE, Oct. 1992, pp. 712-716, vol. 2.
Lervik, et al., Subband Seismic Data Compression: Optimization and Evaluation, IEEE, Sep. 1996, pp. 65-68.

(Continued)

*Primary Examiner* — Janet Suglo
(74) *Attorney, Agent, or Firm* — Abimbola Bukoye

(57) ABSTRACT

To process seismic data, a set of data values representing a seismic trace is received, and amplitudes of data values associated with plural groups in the set are analyzed. Different numbers of bits are dynamically allocated to at least some of the groups of the set according to the analyzing.

22 Claims, 4 Drawing Sheets

(56) References Cited

OTHER PUBLICATIONS

Mohsenian, et al., Single-Pass Constant -and Variable-bit-rate MPEG-2 Video Compression, IBM Journal of Research and Development, Jul. 1999, pp. 489-509, vol. 43 No. 4.
Liu, et al., A New Criterion and Associated bit Allocation Method for Current Audio Coding Standards, Proceedings of the 5th Int. Conference on Digital Audio Effects, Sep. 2002.
Averbuch, et al., Low Bit-Rate Efficient Compression for Seismic Data, IEEE Transactions on Image Processing, Dec. 2001, pp. 1801-1814, vol. 10, No. 12.
Donoho, et al., High-Performance Seismic Trace Compression, SEG, 1995, pp. 160-163.
PCT Search Report, dated Feb. 4, 2010, Application No. PCT/US2008/071826.

* cited by examiner

DYNAMICALLY ALLOCATING DIFFERENT NUMBERS OF BITS TO WINDOWS OF A SERIES REPRESENTING A SEISMIC TRACE

CROSS-REFERENCE TO RELATED APPLICATION

This claims the benefit under 35 U.S. C. §119(e) of U.S. Provisional Application Ser. No. 60/963,135, filed Aug. 2, 2007, which is hereby incorporated by reference.

TECHNICAL FIELD

The invention relates generally to dynamically allocating different numbers of bits to time (or depth) windows of a series representing a seismic trace.

BACKGROUND

Seismic surveying is used for identifying subterranean elements, such as hydrocarbon reservoirs, fresh water aquifers, gas injection reservoirs, and so forth. In performing seismic surveying, seismic sources and seismic sensors can be placed at various locations on an earth surface (e.g., a land surface or a sea floor), or even in a wellbore, with the seismic sources activated to generate seismic waves. Examples of seismic sources include explosives, air guns, acoustic vibrators, or other sources that generate seismic waves.

Some of the seismic waves generated by a seismic source travel into a subterranean structure, with a portion of the seismic waves reflected back to the surface (earth surface, sea floor, or wellbore surface) for receipt by seismic sensors (e.g., geophones, hydrophones, etc.). These seismic sensors produce signals that represent detected seismic waves. Signals from the seismic sensors are processed to yield information about the content and characteristics of the subterranean structure.

Seismic data received from seismic sensors, in the form of seismic traces, are typically represented digitally using a number of bits. Conventionally, static bit allocation is used such that a static number of bits (e.g., 16 or 32 bits) represent seismic data values. An issue associated with static bit allocation is that precision can be adversely affected. Use of static bit allocation can be associated with loss of fidelity in a seismic trace, particularly in areas of the seismic trace with large amplitude contrast.

SUMMARY

In general, according to an embodiment, a method of processing seismic data includes receiving a set of data values representing a seismic trace, and analyzing amplitudes of data values in plural groups in the set. Different numbers of bits are dynamically allocated to at least some of the groups of the set according to the analyzing.

Other or alternative features will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments are possible.

Figure 1:
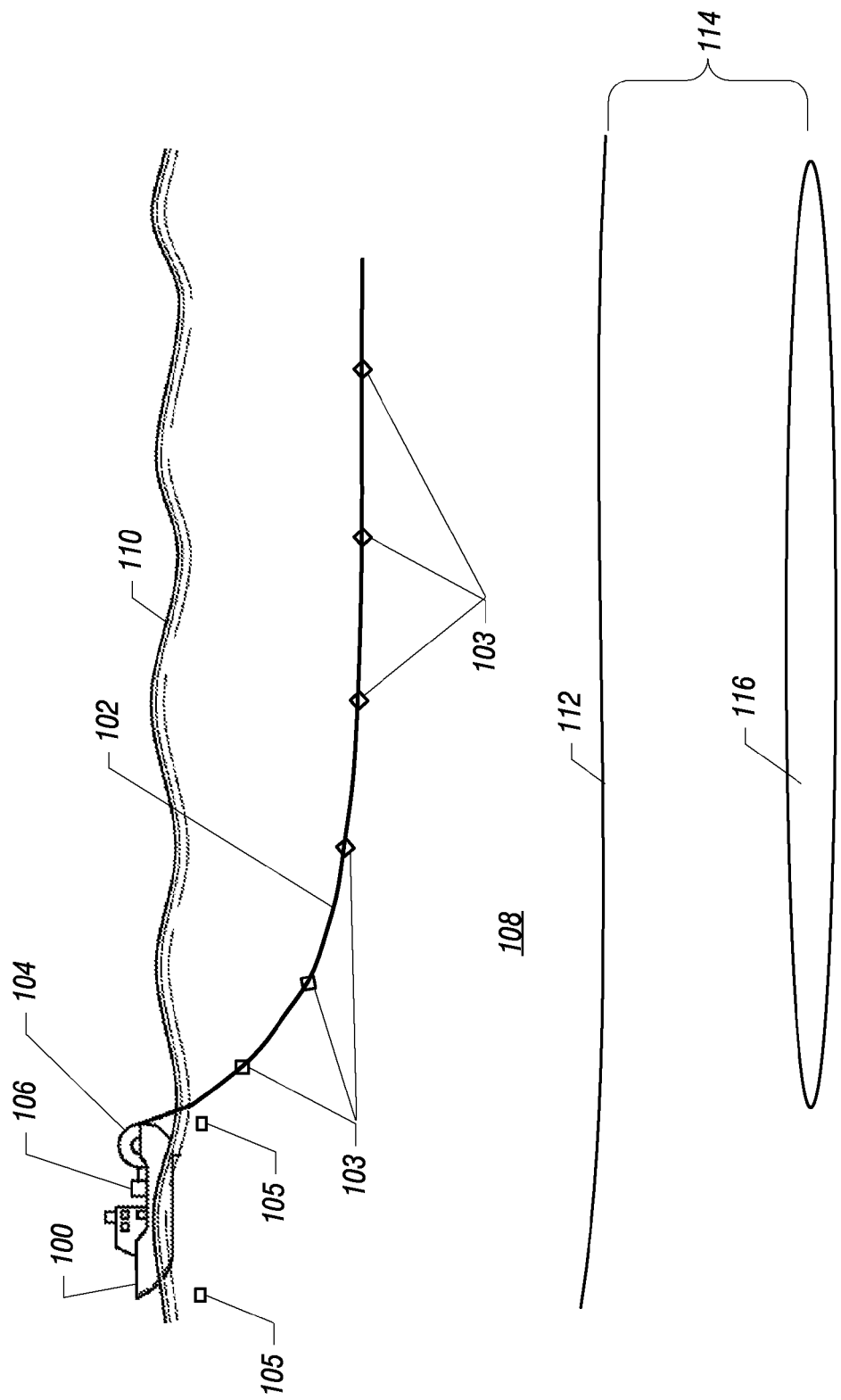
FIG. 1 is a block diagram of an example arrangement in which an embodiment of the invention can be incorporated.

FIG. 1 illustrates an example arrangement to perform marine seismic surveying. In different implementations, however, other embodiments can involve land-based seismic surveying or wellbore seismic surveying.

FIG. 1 illustrates a sea vessel 100 that has a reel or spool 104 for deploying a streamer 102 (or multiple streamers 102), where the streamer 102 is a cable-like carrier structure that carries a number of electronic devices 103 for performing a subterranean survey of a subterranean structure 114 below a sea floor 112. In the following, the term "streamer" is intended to cover either a streamer that is towed by a sea vessel or a sea bed cable laid on the sea floor 112.

The electronic devices 103 can include sensors, steering or navigation devices, air gun controllers (or other signal source controllers), positioning devices, and so forth. Also depicted in FIG. 1 are a number of signal sources 105 that produce signals propagated into the body of water 108 and into the subterranean structure 114. Although the sources 105 are depicted as being separate from the streamer 102, the sources 105 can also be part of the streamer 102 in a different implementation.

The signals from the sources 105 are reflected from layers in the subterranean structure 114, including a resistive body 116 that can be any one of a hydrocarbon-containing reservoir, a fresh water aquifer, a gas injection zone, and so forth. Signals reflected from the resistive body 116 are propagated upwardly toward the sensors of the streamer 102 for detection by the sensors. Measurement data is collected by the sensors, which can store the measurement data and/or transmit the measurement data back to a control system (or controller) 106 on the sea vessel 100.

The sensors of the streamer 102 can be seismic sensors, such as hydrophones and/or geophones. The signal sources 105 can be seismic sources, such as air guns or explosives. Seismic data recorded by the seismic sensors on the streamer are provided back to a control system (controller) 106 on the sea vessel. The control system 106 samples the recorded data to produce a time series of seismic data samples at discrete time points. The time series represents a seismic trace.

In accordance with some embodiments, a dynamic allocation of a number of bits for representing data values for time windows of seismic data samples is performed. A time series of seismic data values can be divided into a number of time windows, with dynamic bit allocation performed for each time window. The dynamic bit allocation allows for some time windows to be allocated different numbers of bits from other time windows. For each time window, the allocated bits are used to store data values (samples) in the corresponding time window.

Although this description refers to "time series" of seismic data values that are divided into multiple time windows to allow for dynamic allocation of numbers of bits to respective time windows, it is contemplated that the dynamic bit allocation technique can be applied generally to a "set" (where a time series is an example type of "set") of seismic data values, where the set can be divided into plural groups or windows that are dynamically allocated corresponding numbers of bits. For example, a set of data can include data collected for different depths (referred to as a "depth series").

Note that each time window includes a predetermined number of samples. The window size can be varied such that the predetermined number can be set to different values according to an analysis of data fidelity versus data compression. In one specific example, the window size can be set to 32 (in other words, each window of the time series includes 32 seismic data samples).

Figure 2:
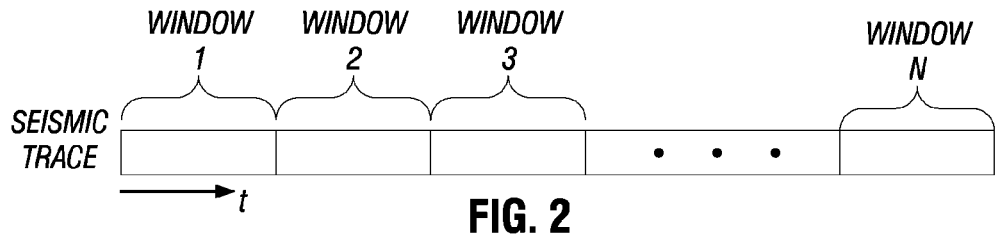
FIG. 2 illustrates the division of an example time series representing a seismic trace into multiple time windows.

FIG. 2 is a schematic representation of a time series that represents a seismic trace, where the seismic trace includes seismic data samples (raw data) at different time points (t). "Raw data" refers to sampled seismic data received from a seismic sensor. As depicted in FIG. 2, the time series is divided into multiple windows: window 1, window 2, window 3, . . . , window N (N being an integer number). Each window has a predetermined number of seismic data samples.

Figure 3:
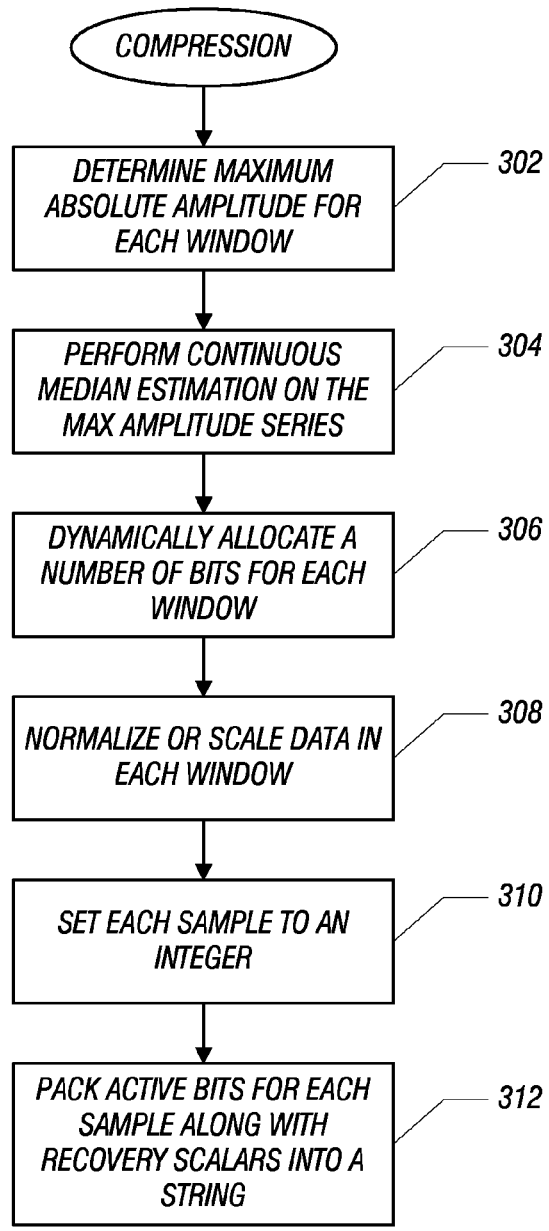
FIG. 3 is a flow diagram of a process of compressing seismic data that includes dynamically allocating numbers of bits to store data values in time windows of a seismic trace, according to an embodiment.

A procedure according to an embodiment of performing data compression that involves dynamic bit allocation is illustrated in FIG. 3. The procedure can be performed by software executable on a computer, such as a computer according to FIG. 5, in one example. The procedure determines (at 302) the maximum absolute amplitude of seismic data values in each window. In other words, for a given window i having data samples $d_1, d_2, \ldots d_m$ (m being the predetermined size of each window), the maximum absolute amplitude from among $d_1, d_2, \ldots, d_m$ is determined. The determination is performed by comparing the amplitudes of the seismic data samples within a particular window, and identifying the maximum value from these amplitudes. Assuming there are N windows, there will be N maximum amplitude values corresponding to the N windows.

Figure 4:
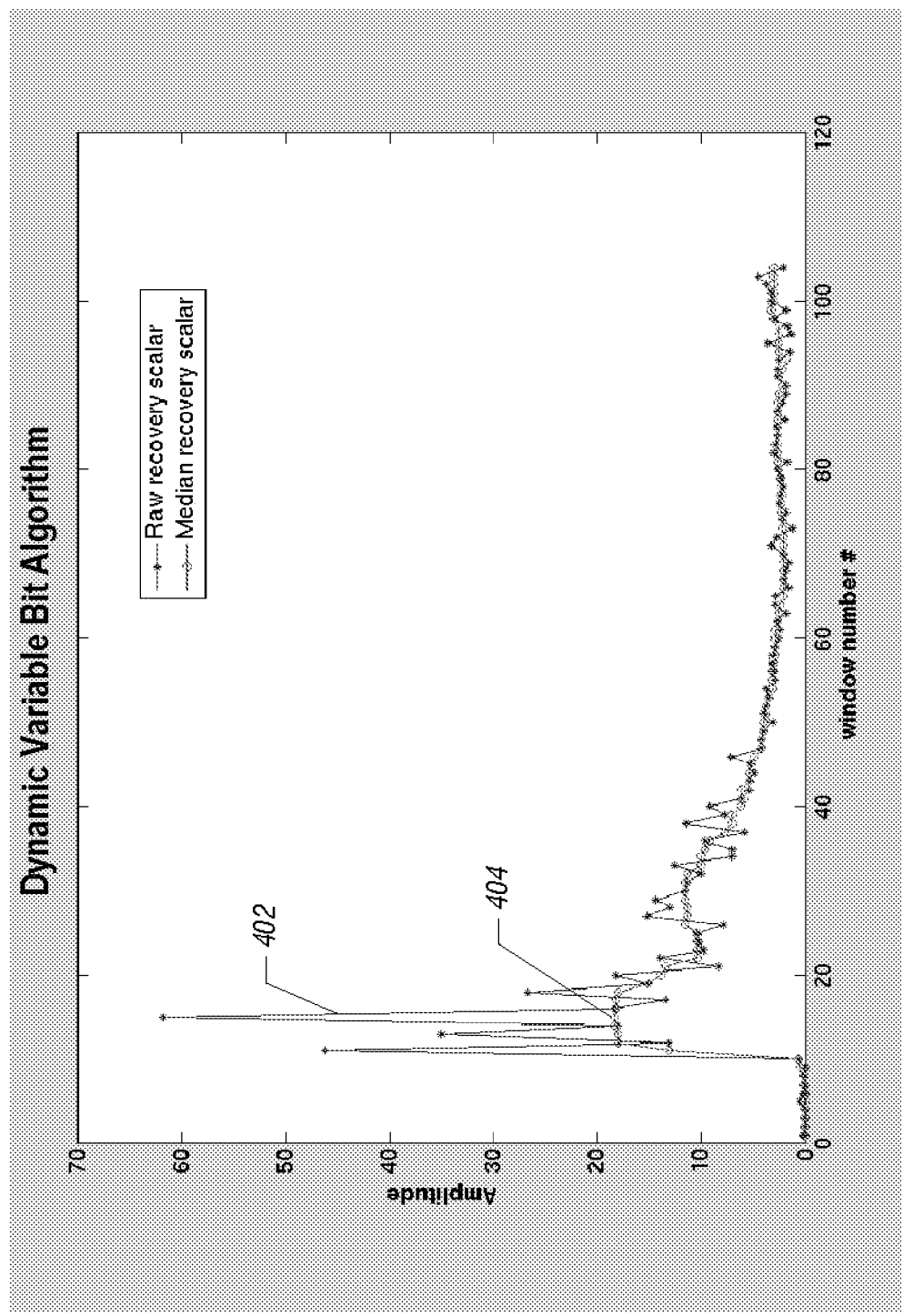
FIG. 4 is a graph that depicts example scalars in corresponding time windows, along with associated median estimates.

The maximum amplitudes for the N windows are represented as raw scalars $A_1, A_2, \ldots, A_N$. FIG. 4 is a graph that plots maximum amplitudes, $\{A_1, A_2, \ldots, A_N\}$, according to window number. A curve 402 represents maximum amplitudes in the different windows. The series of maximum amplitudes is referred to as a max amplitude series, which is a series having N raw scalars $\{A_1, A_2, \ldots, A_N\}$.

Next, continuous median estimation is performed (at 304) on the max amplitude series. The continuous median estimator computes a median for every sample in the input max amplitude series, where the estimate is centered at the middle of a sliding operator of fixed length. Given an input max amplitude series represented as $\{A_1, A_2, A_3, \ldots A_N\}$, where $A_i$ (i=1 to N) represents the maximum amplitude for a window i, a median series is computed is as follows: $\{M_1, M_2, M_3, \ldots M_N\}$, where $M_i$ is the median over a fixed length operator centered at the $i^{th}$ sample. Thus, for a median operator length of 5, the median at sample 3 ($M_3$), would be the median of $\{A_1, A_2, A_3, A_4, A_5\}$. The $M_i$ values are also referred to as centered running median values.

Note that the computing cost associated with the median analysis is greatly reduced by performing the analysis on the maximum amplitude scalars instead of on the raw data associated with the seismic trace.

FIG. 4 also shows a curve 404 that represents the median series containing running median scalars $\{M_1, M_2, \ldots, M_N\}$ calculated from the maximum amplitude values represented by curve 402. In a different embodiment, instead of calculating centered running median values based on the maximum amplitude values, centered running mean values can be calculated instead. In yet other embodiments, other centered running aggregates can be calculated, such as cumulative sums, and so forth.

Next, a number of bits are dynamically allocated (at 306) for each window of the time series for representing seismic data samples in the corresponding window. In performing the dynamic allocation of numbers of bits for the windows of the time series, at least some of the windows are allocated different numbers of bits.

In one embodiment, the dynamic allocation of numbers of bits for windows involves both static and dynamic allocation. The static allocation involves the allocation of a minimum (static) number of bits to each window, such as 16 bits in one example. The dynamic allocation aspect refers to the allocation of an additional number of bits ($n_i$) to corresponding windows (i), based on the values of the max amplitude series (containing raw scalars $A_1, A_2, \ldots, A_N$) and median series (containing median scalars $M_1, M_2, \ldots, M_N$) discussed above. Generally, the dynamic allocation of a number of bits $n_i$ for each window is based on analyzing values associated with the windows of the time series, which in one embodiment includes the maximum amplitude values and median values. The total allocated number of bits in each window is equal to the sum of the statically allocated number (e.g., 16) and the dynamically allocated number $n_i$.

The input to the process of dynamically allocating the additional number of bits, $n_i$, for each window i includes: (1) the max amplitude series $\{A_1, A_2, \ldots, A_N\}$, and (2) the median series $\{M_1, M_2, \ldots, M_N\}$. From the maximum amplitude values and the median values of these series, values $r_i$ can be computed as follows:

$$r_i = \frac{A_i}{M_i}, \qquad \text{(Eq. 1)}$$

where i=1 to N. To calculate the $n_i$ values, where $n_i$ is the number of dynamic bits for the $i^{th}$ window, the following relation is defined:

$$2^{fn_i} = r_i, \qquad \text{(Eq. 2)}$$

where $fn_i$ represents a floating variable having a value based on $r_i$ according to the relationship of Eq. 2. Note that $n_i$ is an integer value.

The additional number of bits for window i, $n_i$, is approximated as follows:

$$n_i \approx int(a * fn_i), \qquad \text{(Eq. 3)}$$

where "int" represents an integer function, and a represents a scale factor that is unknown at this point. An iterative process is used to find the value a, subject to the following constraint:

$$\sum_{i=1}^{N} n_i = \text{num\_dynamic\_bits} * N, \qquad \text{(Eq. 4)}$$

where num_dynamic_bits represents a predefined average number of bits per window. The average number of bits per window, num_dynamic_bits multiplied by the number of windows N, refers to the total number of additional bits that are to be allocated to the N windows. Thus, the numbers of bits to be allocated to the windows should satisfy the constraint on the total number of additional bits to be allocated as defined by Eq. 4. An iterative process is performed using Eqs. 3 and 4 until the scale factor a is identified for which the constraint of Eq. 4 is satisfied. The objective is to provide a fidelity in each window to a consistent level based on the median analysis.

Next, the data values in each window are normalized or scaled (at 308). To normalize or scale, a scaling factor $s_i$ is calculated as follows:

$$s_i = \frac{2^{l_i}}{A_i}, \qquad \text{(Eq. 5)}$$

where $l_i$ is equal to the sum of $n_i$ and 16 bits (note that each window is allocated 16 (or other static number of) bits plus $n_i$, the dynamic number of bits). The scaling factor $s_i$ is multiplied by each seismic data sample in the window i. In this way, the maximum amplitude in the window, $A_i$, is equal to the maximum amplitude for the actual number of bits assigned to the window.

Next, each seismic data sample is set (at 310) to an integer value, which in one example is a 32-bit integer value. Note that in most instances, the high-order bits of the 32-bit integer would be 0s. The active bits for each seismic data sample (active bits do not include the high-order bits that are 0s) are then packed or compressed (at 312) along with recovery scalars into a string, such as a byte string. The recovery scalars and the number of bits in each window ($s_i$ and $l_i$ from Eq. 5), can be used for decompressing the data at a later time when analysis of the data is to be performed.

The compression algorithm above is performed each time data received from a seismic sensor is to be saved in the control system 106. The compression reduces the number of bits that have to be stored. When reading previously compressed data from storage, a decompression algorithm is applied, which is the reverse of the normalization/scaling performed at 308.

Figure 5:
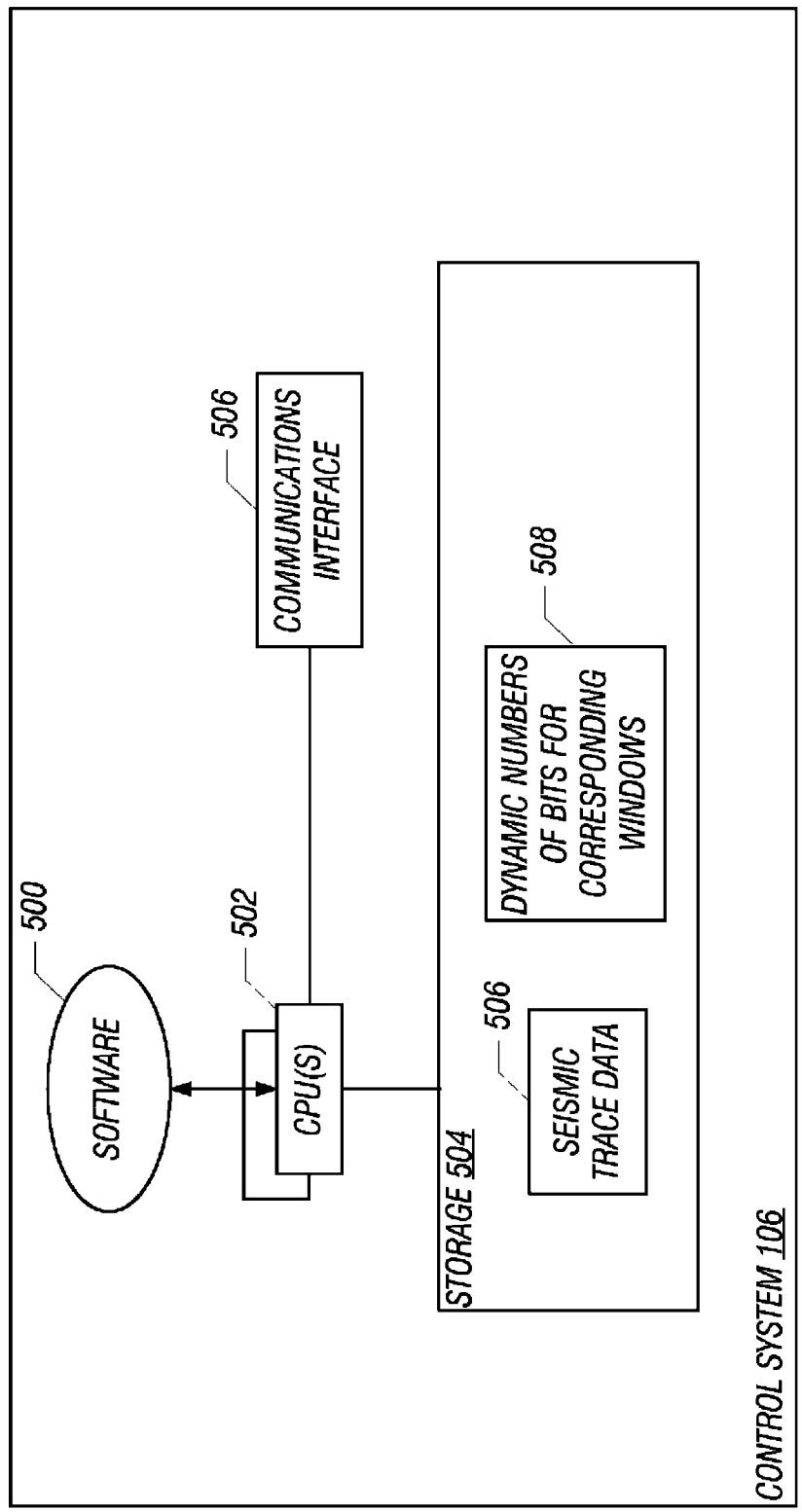
FIG. 5 is a block diagram of an example control system that incorporates software according to an embodiment.

The procedure of FIG. 3 can be performed by software 500 implemented in the control system 106 (e.g., a computer), as depicted in FIG. 5. The software 500 of the control system 106 is executable on one or more central processing units (CPUs) 502. The CPU(S) 502 is (are) connected to a storage 504 and a communications interface 506. The storage 504 contains seismic trace data 506 that is fed into the software 500 to perform the dynamic bit allocation procedure of FIG. 3. The output of the software 500 includes the dynamic additional numbers of bits, $n_i$, for corresponding windows i, which can also be stored in the storage 504 (as 508).

Instructions of the software 500 are loaded for execution on a processor (such as one or more CPUs 502 in FIG. 5). The processor includes microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

While the invention has been disclosed with respect to a limited number of embodiments, those skilled in the art, having the benefit of this disclosure, will appreciate numerous modifications and variations therefrom. It is intended that the appended claims cover such modifications and variations as fall within the true spirit and scope of the invention.

What is claimed is:

1. A method of processing seismic data, comprising:
   receiving, by a system having a processor, a set of data values representing a seismic trace;
   determining, by the system, maximum absolute amplitudes of data values in corresponding plural groups in the set, wherein the determining includes identifying, for at least one of the plural groups, the corresponding maximum absolute amplitude from among data values in the respective group;
   computing, by the system, an aggregate of the maximum absolute amplitudes to produce aggregate values;
   dynamically allocating, by the system, different numbers of bits to at least some of the groups of the set according to the determined maximum absolute amplitudes and the aggregate values;
   using the dynamically allocated numbers of bits to store data values in the corresponding groups: and
   identifying, by the system using the stored data values, a subterranean element in a subterranean structure.

2. The method of claim 1, further comprising receiving data from at least one seismic sensor, wherein the set is produced by sampling the data received from the at least one seismic sensor.

3. The method of claim 1, wherein receiving the set comprises receiving a series of the data values representing the seismic trace, wherein the plural groups comprise plural windows of the series, and wherein dynamically allocating different numbers of bits to at least some of the groups comprises dynamically allocating different numbers of bits to at least some of the windows of the series, wherein the series comprises one of a time series and depth series.

4. The method of claim 3, wherein the series is divided into the plural windows, and wherein determining the maximum absolute amplitudes comprises determining a maximum absolute amplitude of data values within a corresponding window.

5. The method of claim 4, further comprising defining a constraint, wherein dynamically allocating the different numbers of bits to at least some of the windows is further based on the constraint.

6. The method of claim 1, wherein the computing comprises computing the aggregate values for corresponding groups, wherein the aggregate values are computed from respective different subsets of the determined maximum absolute amplitudes.

7. The method of claim 6, wherein computing the aggregate values comprises computing one of running median estimates of the determined maximum absolute amplitudes and running mean estimates of the determined maximum absolute amplitudes.

8. The method of claim 6, further comprising computing ratios of the determined maximum absolute amplitudes to corresponding aggregate values, and wherein dynamically allocating the different numbers of bits is based on the ratios.

9. The method of claim 1, further comprising:
computing scaling factors for corresponding groups; and
applying the scaling factor of a corresponding group to data values within the corresponding group.

10. The method of claim 9, wherein computing the scaling factors is based on the respective number of bits allocated to the corresponding group and the respective maximum absolute amplitude of data values within the corresponding group.

11. The method of claim 1, wherein receiving the set of data values representing the seismic trace comprises receiving the set of data values from at least one seismic sensor on a streamer towed in a body of water.

12. The method of claim 1, wherein identifying the corresponding maximum absolute amplitude for the at least one of the plural groups includes comparing amplitudes of the data values in the respective group, and identifying a maximum of the compared amplitudes.

13. An article comprising at least one non-transitory computer-readable storage medium containing instructions that when executed cause a computer to:
receive a series representing a seismic trace, wherein the series comprises one of a time series and depth series;
determine scalars corresponding to plural windows of the series, wherein determining the scalars comprises determining maximum absolute amplitudes of data values within corresponding windows, wherein determining the maximum absolute amplitudes includes identifying, for at least one of the plural windows, the corresponding maximum absolute amplitude from among data values in the respective window;
compute an aggregate of the scalars to produce aggregate values;
dynamically allocate numbers of bits to corresponding windows of the series according to the scalars and the aggregate values;
use the dynamically allocated numbers of bits to store data values within the corresponding windows: and
identify, using the stored data values, a subterranean element in a subterranean structure.

14. The article of claim 13, wherein computing the aggregate comprises computing one of a continuous median of the scalars and a continuous mean of the scalars.

15. The article of claim 13, wherein the scalars are represented as $\{A_1, A_2, \ldots A_N\}$ for windows i, i=1 to N, and wherein the aggregate values are represented as $\{M_1, M_2, \ldots, M_N\}$, wherein the instructions when executed cause the computer to further:

compute $r_i = \frac{A_i}{M_i}$, i = 1 to N, wherein dynamically allocating the numbers of bits is according to $r_i$.

16. The article of claim 15, wherein dynamically allocating the numbers of bits is according to $r_i$, i=1 to N, and further according to a constraint that specifies a total number of bits to be allocated to the windows.

17. The article of claim 13, wherein the instructions when executed cause the computer to further:
normalize the maximum amplitudes in the windows according to the corresponding dynamically allocated number of bits.

18. The article of claim 13, wherein the instructions when executed cause the computer to further:
compute ratios of the scalars to corresponding aggregate values,
wherein dynamically allocating the numbers of bits is based on the ratios.

19. The article of claim 13, wherein identifying the corresponding maximum absolute amplitude for the at least one of the plural windows includes comparing amplitudes of the data values in the respective window, and identifying a maximum of the compared amplitudes.

20. A computer comprising:
an interface to receive seismic data; and
at least one processor to:
sample the received seismic data to obtain a series of seismic data samples, wherein the series is divided into plural windows, and wherein the series comprises one of a time series and depth series;
determine scalars for the corresponding windows, wherein the scalars are based on the seismic data samples in the corresponding windows, and the scalars represent respective maximum absolute amplitudes of the seismic data samples in the corresponding windows, wherein determining the maximum absolute amplitudes includes identifying, for at least one of the plural windows, the corresponding maximum absolute amplitude from among data values in the respective window;
compute an aggregate of the scalars to produce aggregate values;
dynamically allocate numbers of bits to the windows of the series according to the scalars and the aggregate values, wherein the dynamically allocated numbers of bits are useable to store data values in the corresponding windows: and
identify, using the stored data values, a subterranean element in a subterranean structure.

21. The computer of claim 20, wherein the at least one processor is configured to further:
compute ratios of the scalars to corresponding aggregate values,
wherein the dynamically allocated numbers of bits are based on the ratios.

22. The computer of claim 20, wherein the scalars are determined by comparing, for at least one of the plural windows, amplitudes of the seismic data samples in the respective window, and identifying a maximum of the compared amplitudes.

* * * * *